Patented Nov. 10, 1942

2,301,811

UNITED STATES PATENT OFFICE 2,301,811

2-KETO-LEVO-GULONIC ACID AND PROCESS FOR THE MANUFACTURE OF SAME

Tadeus Reichstein, Zurich, Switzerland, assignor to Hoffmann-La Roche Inc., Nutley, N. J., a corporation of New Jersey No Drawing. Application October 18, 1934, Serial No. 748,925. In Switzerland October 25, 1933

15 Claims. (Cl. 260—344)

Of the 2-keto-hexonic acids only two representatives have so far been described, namely the 2-keto-d-gluconic acid and the 2-keto-d-gelactonic acid, and of these only the first mentioned has been thoroughly investigated. Two methods for obtaining representatives of these bodies have been described. The first consists in oxidising hexosones with bromine water (Biochemische Zeitschrift, vol. 207, 1929, pp. 217 and 230). This method has the disadvantage of starting from difficultly obtainable materials. The second method has been described by H. Ohle (Berichte der Deutschen Chemischen Gesellschaft, vol. 63, 1930, p. 843) for obtaining 2-keto-d-gluconic acid. He starts from fructose, which is oxidised in the form of the β-diacetone compound, whereupon the acetone radicles are again split off. It is clear that this method cannot a priori be applied to the manufacture of other representatives of 2-keto-hexonic acids, because in the first place there do not exist manufacturing methods for all the necessary keto sugars, and secondly even with sugars having the hydroxyls in suitable position it could not be foretold, whether they would react in a suitable manner with acetone. It was therefore not to be expected that it would be possible to obtain a 2-keto-hexonic acid of the peculiar structure of the 2-keto-levo-gulonic acid, which is an important intermediary product for the manufacture of levo-ascorbic acid (vitamin C).

The process for the manufacture of 2-ketolevo-gulonic acid consists in transforming levosorbose with the aid of carbonyl compounds, such as formaldehyde, acetone, methyl-ethyl-ketone and the like, into the corresponding bis-methylene-ether-derivatives, treating these in alkaline solution with oxidising agents, which oxidise a $CH_2OH$ group to the carboxyl group, such as for instance permanganate, ferricyanide and the like, and heatig the bis-methylene-ether-2-ketolevo-gulonic acid, obtained from the solutions by the addition of a strong acid, with water or dilute acids in order to split off the carbonyl compounds.

The process is represented by the following formulae, in which R is a methylene radicle:

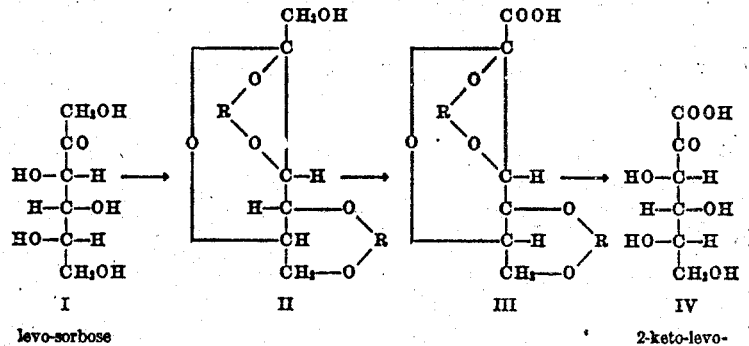

In the present process alterations in various directions may be made. Thus it is not at all necessary to isolate all the intermediary products mentioned. The solution obtained by alkaline oxidation of the bis-methylene-ether-levo-sorbose may be transformed into the free bis-methylene-ether-2-keto-levo-gulonic acid without isolating a salt. The isolation of this acid too may be eliminated by adding to the solution of the crude or pure salt at least as much of a strong acid as is necessary for freeing the bis-methylene-ether-ketoacid and thus obtaining the free 2-keto-levogulonic acid. Finally, if one wishes to obtain an ester, the separation of the free 2-keto-levo-gulonic acid in the pure state may be left out altogether. Thus for instance diacetone-2-keto-levogulonic acid or one of its salts may be dissolved in an alcohol with the addition of at least one molecule of water (advantageously not more than three molecules of water) and after the addition of hydrochloric acid gas, sulphuric acid or the like left to stand at room temperature or heated, until the transformation has taken place. When using free diacetone-keto-acid a very small quantity of hydrogen chloride gas is sufficient; if a salt is used, a quantity sufficient for binding the base should be added. Other dimethyleneether-derivatives of 2-keto-levo-gulonic acid may be treated in a similar manner; where the compounds are derived from aldehydes, the addition of water for the separation is not necessary.

The 2-keto-levo-gulonic acid is a strong acid forming colourless crystals melting at 171° C. (corr.) with decomposition. Its specific rotation is $[\alpha]^{18}_D = -48°$ (c.=1.0 in water). Boiling Fehling's solution is rapidly reduced by the acid. 2-keto-levo-gulonic acid is the first of the 2-keto-hexonic acids, which has been obtain in crystalline form. Its salts and likewise its esters are obtained in the normal manner. The esterification may be carried out in different ways, for instance by heating the free acid with a large excess of an alcohol without any further addition, the transformation being performed by a continuous process in which from a boiling solution of the components the alcohol laden with the water-vapour formed is distilled off, dehydrated with a suitable drying agent after condensation and returned to the reaction receptacle. By the addition of suitable hydro-carbons, such as benzene, the process may be accelerated. The addition of mineral acids, toluene-sulphonic acid and the like also has an accelerating effect. The esters may further be obtained in quantitative yield by the reaction of the corresponding diazo-aliphatic hydrocarbons with a solution of the acid in the corresponding alcohol, or from a salt of the acid with alkyl halides, alkyl sulphates or sulphites. The 2-keto-levo-gulonic-acid-methyl-ester forms colourless crystals melting at 155–157° C. Its specific rotation is $[\alpha]^{18}_D = -25°$ (c.=1.0 in methanol). The specific rotation of the ethyl-ester is $[\alpha]^{20}_D = -14.5°$ (c.=0.63 in absolute alcohol).

Example 1

1 kilogram of levo-sorbose, obtained from sorbite by oxidation with the aid of bacterium xylinum, is suspended in 20 liters of acetone and after careful addition of 800 ccm. of concentrated sulphuric acid stirred for about 24 hours; the sugar will have dissolved before this time. The light-yellow solution is neutralised in the usual manner with ammonia gas, anhydrous soda, potash or the like, made slightly alkaline, well dried and after filtration the acetone is distilled off. The residue distils in vacuo at 0.5 mm. and about 140° C. and forms a colourless, very viscous oil. A fraction of higher boiling point contains principally the mono-acetone-compound and by further treatment with acetone yields more diacetone-sorbose. In the cold it sets to a glassy mass. Recrystallised from benzine, the diacetone-levo-sorbose forms colourless crystals melting at 77–78° C. Its specific rotation is $[\alpha]^{18.5}_D = -18.1°$ (c.=1.38 in acetone). It is easily soluble in organic solvents, except petroleum-ether, benzine, likewise in water. The yield is 1 to 1.2 kilograms.

1 kilogram of diacetone-levo-sorbose is suspended in 10 liters of water, in which previously 0.45 kilograms of potassium hydroxide had been dissolved, and dissolved as far as possible. Within two hours a solution of 0.86 kilograms of potassium permanganate in 20 liters of water is added while stirring, the temperature being kept at 30° C. The stirring is continued for about four hours and alcohol is added until the colouration has disappeared. The precipitated manganese dioxide is removed by filtration; carbon dioxide is passed into the clear solution until there is no more free alkali, and hereafter the product is evaporated in vacuo to dryness. If the pure potassium salt is to be isolated, the residue is boiled with absolute alcohol until the latter ceases to take up any more of the product. From the filtered solution the salt is precipitated in long needles after cooling and being left to stand for some time. Further quantities are obtained by evaporating the mother liquors, finally also by the addition of ether. The yield is 1 to 1.1 kilogram. The salt melts only above 300° C. with decomposition. Its specific rotation is $[\alpha]^{18}_D = -13.8°$ (c.=1.08 in water). If the crude salt containing carbonate is to be further worked up, it will be sufficient to wash it thoroughly with ether, whereby small quantities of unchanged diacetone-sorbose are removed.

1 kilogram of the potassium salt is dissolved in 2 liters of water, about ½ kilogram of finely crushed ice is added and while stirring thoroughly a mixture of ½ liter of 35 per cent hydrochloric acid, ½ liter of water and ½ kilogram of finely crushed ice is likewise added. The acid is precipitated in leaflets. After being left to stand for a short time it is removed by suction, well pressed out and washed three times with just the sufficient quantity of ice-water. From the mother liquors and wash-waters the remnant may be obtained by quickly shaking with ether or ethyl acetate, if possible always in the presence of finely crushed ice. The yield is about 0.8 kilogram. The crystals have no definite melting point. They contain one molecule of water of crystallisation, which is partly removed by heating and partly causes splitting off of acetone. They sinter at about 75–77° C. to a turbid mass, which clears only at about 95° C. When being dried in high vacuum at room temperature they likewise become sticky and form a viscous mass. In the open air or in closed tubes they seem to be more stable. The compound is a strong acid, which turns Congo-paper blue. Fehling's solution is not reduced, unless the aqueous solution of the product is first heated and then only Fehling's solution added.

800 grams of the diacetone compound are dissolved in 5–10 liters of water, heated to boiling point and then heated on the boiling water-bath until the splitting off of acetone is terminated, which will be in about 30–40 minutes. The product is then evaporated in vacuo to a thick syrup, which on being scratched quickly crystallises. After complete crystallisation the product is ground with acetone, the liquid removed by suction and washed with acetone. A small second crop may be obtained from the mother liquors by evaporating in vacuo. The yield is about 520 grams.

Example 2

1 kilogram of powdered levo-sorbose, 5 kilograms of tri-hydroxy-methylene and a mixture of 3.5 kilograms of sulphuric acid and 3.5 kilograms of water are very thoroughly mixed together and heated to 80° C. After cooling ice is added and the solution poured into an excess of ice-cooled strong potash-solution. The liquid is removed by suction; the solid salts washed with a little potash-solution and much chloroform, then the liquid portions are again shaken with chloroform. The solution is dried with sodium sulphate, freed from chloroform by distillation and the residue distilled in high vacuum. After a slight crystalline first fraction in the bulk of di-formal-levo-sorbose distils at a pressure of 0.2 mm. at about 132° C. and quickly congeals. For purifying the product is recrystallised twice by dissolving in hot benzene and adding the same volume of dry ether before it has quite cooled down. The di-formal-levo-sorbose forms colourless crystals melting at 77–78° C. Its specific rotation is $[\alpha]^{20}_D = -45.7°$ (c.=1.97 in water). It is easily soluble in water;

in benzene it is much more difficultly soluble than the diacetone compound. In benzine it is difficultly soluble, very easily soluble in chloroform.

2.5 kilograms of di-formal-levo-sorbose are dissolved in 30 liters of water containing 1.35 kilograms of potassium hydroxide, and a solution of 2.6 kilograms of potassium permanganate in 60 liters of water is added; a rise of temperature above 30° C. is prevented by cooling. The solution is freed from manganese dioxide, saturated with carbon dioxide, evaporated in vacuo to dryness and the residue boiled with absolute alcohol. From the filtered and evaporated solution a hygroscopic powder is precipitated by the addition of a great deal of absolute ether. This powder is washed with ether, dissolved in ice-water and rendered very decidedly Congo-acid by the addition of strong hydrochloric acid and ice and shaken several times with acetic ester. After drying and evaporating the extracts leave a crystalline residue which is recrystallised from toluene. The di-formal-2-keto-levo-gulonic acid melts at 129-130° C. Its specific rotation is $[\alpha]^{18}_D = -43.25°$ (c.=1.04 in water). The di-formal-2-keto-levo-gulonic acid is a great deal more stable than the other bis-methylene-derivatives of 2-keto-levo-gulonic acid. It may be boiled for a considerable time with aqueous or dilute alcoholic mineral acids without decomposition. For the transformation into 2-keto-levo-gulonic acid according to the method described in Example 1 boiling at some length with dilute acids is necessary.

*Example 3*

1 kilogram of levo-sorbose, 22 kilograms of methyl-ethyl-ketone and 0.8 liters of concentrated sulphuric acid are stirred for 20 hours. The unchanged levo-sorbose is filtered off and the solution treated in the same manner as when preparing the diacetone compound (Example 1). The di-methyl-ethyl-ketone-levo-sorbose crystallises in woolly needles melting at 96-99° C. Its specific rotation is $[\alpha]^{20}_D = -16.6°$ (c.=1.145 in methyl-ethyl-ketone). The di-methyl-ethyl-ketone-levo-sorbose is more difficultly soluble in water than the diacetone compound, otherwise its solubility is similar to that of the diacetone compound.

1.1 kilogram of di-methyl-ethyl-ketone-levo-sorbose are dissolved in 2 liters of pyridine (which does not reduce permanganate), a mixture of 0.4 kilogram of potassium hydroxide and 10 liters of water and then a solution of 0.75 kilogram of potassium permanganate in 14 liters of water are added and stirred. The further working up is the same as described in Example 1, for the diacetone compound. The di-[methyl-ethyl-ketone]-2-keto-levo-gulonic acid is obtained in leaflets, which contain one molecule of water of crystallisation and melt at about 95-100° C. with decomposition. The 2-keto-levo-gulonic acid is prepared in the same manner as the diacetone-2-keto-levo-gulonic acid.

*Example 4*

50 kilograms of benzaldehyde are poured over 2 kilograms of finely powdered levo-sorbose, 0.5 kilogram of hydrochloric acid gas is passed in and the mixture stirred over night, whereby almost all the sugar is dissolved. The dark mixture is dissolved in ether, washed several times with dilute soda-solution, dried with sodium sulphate, freed from the ether by distilling and from the benzaldehyde in high vacuum. The crude di-benzal-levo-sorbose thus obtained is dissolved in purified pyridine, aqueous solutions of potassium hydroxide and potassium permanganate are added and shaken. The manganese dioxide is removed by suction, washed with water and extracted with ether. The alkaline aqueous extracts are shaken with ether and the ether-solutions and the manganese-dioxide extracts united. The crude di-benzal-2-keto-levo-gulonic acid is separated from the purified alkaline aqueous solution by the addition of mineral acid and purified by repeated recrystallisation from boiling toluene. It forms long colourless needles melting at 202-204° C. From the di-benzal-2-keto-levo-gulonic acid the 2-keto-levo-gulonic acid is obtained by boiling for one hour with 10 parts of alcohol and 10 parts n/5 aqueous hydrochloric acid.

The term "carboxylic esters" as used in the claims is intended to mean esters of 2-keto-levo-gulonic acid in which the carboxyl group has been neutralized, as distinguished from other compounds in which other hydroxy groups have been neutralized.

I claim:

1. The 2-keto-levo-gulonic acid, which forms colourless crystals melting at 171° C. (corr.) with decomposition, its specific rotation being $[\alpha]^{18}_D = -48°$ (c.=1.0 in water), the said acid rapidly reducing boiling Fehling's solution and being in the normal manner converted into its salts and esters.

2. The process for the manufacture of 2-keto-levo-gulonic acid, which consists in transforming levo-sorbose with the aid of compounds selected from the group consisting of aldehydes and ketones into bis-methylene-ether derivatives, treating these in alkaline solution with oxidising agents which oxidise a $CH_2OH$ group to a $COOH$ group, and splitting off the carbonyl compounds from the bis-methylene-ether-2-keto-levo-gulonic acids thus obtained by heating with water, the solution having an acid reaction.

3. The process for the manufacture of 2-keto-levo-gulonic acid, which consists in transforming levo-sorbose with the aid of acetone into diacetone-levo-sorbose, treating the said diacetone-levo-sorbose in alkaline solution with oxidising agents which oxidise a $CH_2OH$ group to a $COOH$ group, and splitting off the acetone from the di-acetone-2-keto-levo-gulonic acid thus obtained by heating with water, the solution having an acid reaction.

4. The process for the manufacture of 2-keto-levo-gulonic acid, which consists in transforming levo-sorbose with the aid of acetone into diacetone-levo-sorbose, treating the said diacetone-levo-sorbose in alkaline solution with potassium permanganate and splitting off the acetone from the diacetone-2-keto-levo-gulonic acid thus obtained by heating with water, the solution having an acid reaction.

5. The process for the manufacture of 2-keto-levo-gulonic acid, which comprises reacting levo-sorbose with a compound which is capable of protecting all the reactive hydroxyl radicals other than that of the terminal primary alcohol group contiguous to the keto group, oxidizing such terminal alcoholic group to a carboxyl group, and then splitting off the protecting compound.

6. The process for the manufacture of 2-keto-levo-gulonic acid, which comprises reacting levo-sorbose with a removable compound which renders all of the OH radicals of the groups other than the terminal primary alcohol group contiguous to the keto group resistant to mild alkaline oxidation in solution, oxidizing such terminal alcoholic group to a carboxyl group, and then splitting off the removable compound.

7. A substance selected from the group consisting of 2-keto-levo-gulonic acid, its salts obtainable by neutralization or double decomposition of the carboxylic group and its carboxylic esters.

8. The lower alkyl esters of 2-keto-levo-gulonic acid.

9. A compound having the general formula

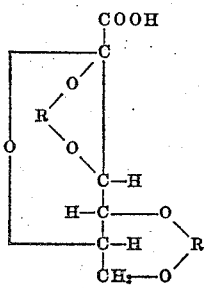

wherein R represents the radical

wherein X and Y are the same or different members of the group consisting of hydrogen, aryl, and aliphatic radicals.

10. A substance selected from the group consisting of bis-methylene-ether-2-keto-levo-gulonic acids and their salts obtainable therefrom by neutralization or double decomposition.

11. A bis-methylene-ether-2-keto-levo-gulonic acid.

12. The compound alpha-keto-1-gulonic acid.

13. The process for the preparation of an α-keto-1-gulonic acid product which comprises treating 1-sorbose to oxidize its terminal keto alcohol group $CO-CH_2OH$ into the α-keto carboxylic acid group $CO-COOH$ with production of an α-keto-1-gulonic acid product capable of conversion into a product having the antiscorbutic properties of vitamin C.

14. An alpha-keto-1-gulonic acid product, the partial oxidation product of 1-sorbose capable of conversion into a vitamin C product.

15. The methyl ester of 2-keto-levo-gulonic acid.

TADEUS REICHSTEIN.